US011870685B2

(12) United States Patent
Fujimoto

(10) Patent No.: US 11,870,685 B2
(45) Date of Patent: Jan. 9, 2024

(54) PACKET CAPSULATION METHOD AND PACKET CAPSULATION DEVICE

(71) Applicant: NEC Corporation, Tokyo (JP)

(72) Inventor: Go Fujimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 199 days.

(21) Appl. No.: 17/433,332

(22) PCT Filed: Jan. 21, 2020

(86) PCT No.: PCT/JP2020/001932
§ 371 (c)(1),
(2) Date: Aug. 24, 2021

(87) PCT Pub. No.: WO2020/179255
PCT Pub. Date: Sep. 10, 2020

(65) Prior Publication Data
US 2022/0150162 A1    May 12, 2022

(30) Foreign Application Priority Data
Mar. 1, 2019 (JP) ................. 2019-037499

(51) Int. Cl.
*H04W 4/00* (2018.01)
*H04L 45/00* (2022.01)
(Continued)

(52) U.S. Cl.
CPC .......... *H04L 45/38* (2013.01); *H04L 12/4633* (2013.01); *H04L 69/22* (2013.01); *H04W 40/02* (2013.01)

(58) Field of Classification Search
CPC ..... H04L 45/38; H04L 12/4633; H04L 69/22; H04L 65/40; H04W 40/02; H04W 84/12
(Continued)

(56) References Cited

U.S. PATENT DOCUMENTS

2005/0220096 A1    10/2005  Friskney et al.
2006/0013142 A1     1/2006  Hongal et al.
(Continued)

FOREIGN PATENT DOCUMENTS

JP    2005-269416 A    9/2005
JP    2008-507202 A    3/2008
(Continued)

OTHER PUBLICATIONS

International Search Report for PCT Application No. PCT/JP2020/001932, dated Apr. 7, 2020.
(Continued)

*Primary Examiner* — Chuong T Ho

(57) ABSTRACT

The packet capsulation device 10 includes capsulation means 11 for encapsulating an initial packet in communication between a first terminal and a second terminal serving as a partner terminal by adding a header for capsulation, and for non-encapsulating on reception of an encapsulated packet, storage means 12 for storing data capable of identifying a path of a packet following the initial packet in the wireless communication channel, and non-encapsulated packet transmission means 13 for transmitting the packet following the initial packet to the wireless communication channel without encapsulating, according to the data capable of identifying the path of the packet.

11 Claims, 12 Drawing Sheets

(51) Int. Cl.
*H04L 12/46* (2006.01)
*H04L 69/22* (2022.01)
*H04W 40/02* (2009.01)

(58) Field of Classification Search
USPC .......................................... 370/329, 330, 328
See application file for complete search history.

(56) References Cited

U.S. PATENT DOCUMENTS

| | | | |
|---|---|---|---|
| 2016/0043950 A1 | 2/2016 | Vobbilisetty et al. | |
| 2016/0127150 A1* | 5/2016 | Qian | H04L 61/5007 370/477 |
| 2016/0134522 A1* | 5/2016 | Ni | H04L 45/42 370/410 |
| 2016/0234752 A1* | 8/2016 | Hsu | H04L 12/4641 |
| 2017/0250838 A1* | 8/2017 | Khawer | H04L 12/4633 |
| 2019/0222552 A1* | 7/2019 | Xiao | H04L 61/2535 |
| 2019/0230039 A1* | 7/2019 | Wang | H04L 49/354 |
| 2020/0106641 A1* | 4/2020 | Kommula | H04L 45/306 |
| 2021/0273883 A1* | 9/2021 | Hu | H04L 67/10 |

FOREIGN PATENT DOCUMENTS

| | | |
|---|---|---|
| JP | 2013-168998 A | 8/2013 |
| JP | 2016-019066 A | 2/2016 |
| JP | 2017-529713 A | 10/2017 |

OTHER PUBLICATIONS

English translation of Written opinion for PCT Application No. PCT/JP2020/001932, dated Apr. 7, 2020.
JP Office Action for JP Application No. 2019-037499, dated May 9, 2023 with English Translation.

\* cited by examiner

PACKET CAPSULATION METHOD AND PACKET CAPSULATION DEVICE

This application is a National Stage Entry of PCT/JP2020/001932 filed on Jan. 21, 2020, which claims priority from Japanese Patent Application 2019-037499 filed on Mar. 1, 2019, the contents of all of which are incorporated herein by reference, in their entirety.

TECHNICAL FIELD

The present invention relates to a packet capsulation method and a packet capsulation device for encapsulating packets in a wireless communication channel.

BACKGROUND ART

There is a communication network that includes a wired communication channel for communication between devices (terminals) installed in a factory (for example, refer to Patent literature 1).

CITATION LIST

Patent Literature

Patent literature 1: Japanese Patent Laid-Open No. 2005-269416
Patent literature 2: Japanese Patent Laid-Open No. 2016-19066

SUMMARY OF INVENTION

Technical Problem

When a communication network using a wired communication channel is installed, the wired communication channel may need to be rewired when the layout in the factory is changed. To reduce the time and effort required for wiring change, for example, it is possible to use a wireless network in an area where layout change is likely to occur. Specifically, a wireless LAN (Local Area Network) may be installed in the area.

However, even if a wireless LAN is simply introduced, when there are terminals that cannot support a wireless LAN, such terminals will not be able to communicate through the wireless communication channel.

To solve such a problem, when a first terminal (a terminal that cannot support wireless LAN) that exists outside the wireless communication channel communicates with a second terminal (terminal that cannot support wireless LAN) that exists outside the wireless communication channel, a router connected to the first terminal should convert the MAC (Media Access Control) address, and a router connected to the second terminal should reverse-convert the MAC address.

However, when multiple routers are involved, for example, the source MAC address corresponding to the first terminal is not transmitted to the second terminal.

Therefore, it is possible to use capsulation to tunnel the wireless communication channel. However, since a new header and other information need to be added to packets from the first terminal for capsulation, the size of packets passing through the wireless communication channel will increase. In other words, throughput is reduced. In addition, when the size of the original packet is large, it is more likely to be fragmented, which also reduces the performance of packet relay (for example, refer to Patent literature 2). Furthermore, when the size of the original packet is large, there is a possibility that the packet will be lost in the way of a path.

It is an object of the present invention to provide a packet capsulation method and a packet capsulation device capable of suppressing decrease in the throughput of data transfer when tunneling a wireless communication channel.

The communication network in the factory is just an example to describe the problem, and the field of application of the invention is not limited to a factory.

Solution to Problem

A packet capsulation method according to the present invention performs capsulation for tunneling in a wireless communication channel included in a communication channel between multiple communicating terminals, and includes encapsulating by adding a header for capsulation to a first initial packet from a first terminal to a second terminal serving as a partner terminal, storing data capable of identifying a path of a packet following the first initial packet in the wireless communication channel, encapsulating by adding a header for capsulation to a second initial packet from the second terminal to the first terminal, storing data capable of identifying a path of a packet following the second initial packet in the wireless communication channel, and transmitting the packet following the first initial packet and the packet following the second initial packet to the wireless communication channel without encapsulating, according to the data capable of identifying the path of the packet.

A packet capsulation device according to the present invention encapsulates for tunneling in a wireless communication channel included in a communication channel between multiple communicating terminals, and includes capsulation means for encapsulating an initial packet in communication between a first terminal and a second terminal serving as a partner terminal by adding a header for capsulation, and for non-encapsulating on reception of an encapsulated packet, storage means for storing data capable of identifying a path of a packet following the initial packet in the wireless communication channel, and non-encapsulated packet transmission means for transmitting the packet following the initial packet to the wireless communication channel without encapsulating, according to the data capable of identifying the path of the packet.

Advantageous Effects of Invention

According to the present invention, it is possible to avoid the loss of packets and suppress decrease in the throughput of data transfer when tunneling a wireless communication channel.

DESCRIPTION OF EMBODIMENTS

Hereinafter, an example embodiment of the present invention is described with reference to the drawings.

Figure 1:
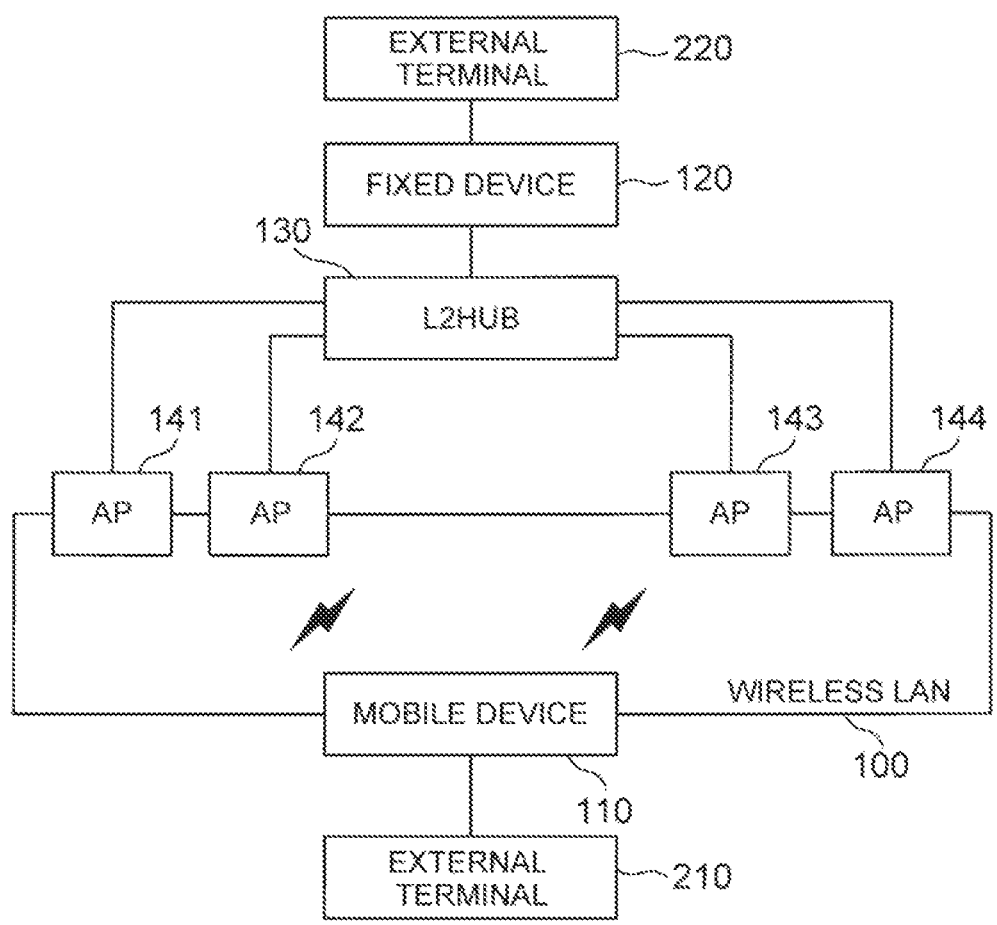
FIG. 1 It depicts a block diagram showing an example of a system to which a packet capsulation device is incorporated.

FIG. 1 is a block diagram showing an example of a system to which a packet capsulation device is incorporated according to the present invention.

In the system shown in FIG. 1, there is a wireless LAN 100 as a wireless communication channel. The wireless LAN 100 relays the communication between terminals 210 and 220.

In the example shown in FIG. 1, there are a mobile device 110 and APs (Access Points) 141-144 that communicate over a wireless LAN 100, and an L2HUB 130 that is connected to a fixed device 120 and APs 141-144. As the L2HUB 130, a general commercial product can be used. As APs 141-144, general wireless LAN routers can be used. When using a wireless LAN router, the wireless LAN router is set to the bridge mode.

The mobile device 110 is movable and has a function of a wireless LAN adapter. In addition, the mobile device 110 has a packet capsulation function. Therefore, the mobile device 110 corresponds to a packet capsulation device. The mobile device 110 may be a self-propelled device, or it may be movable by being mounted on a transport vehicle or the like.

The fixed device 120 is installed in a fixed location and has a router function. In addition, the fixed device 120 has a packet capsulation function. Therefore, the fixed device 120 also corresponds to a packet capsulation device.

In the example shown in FIG. 1, the terminal 210 is connected to the mobile device 110. The terminal 220 is connected to the fixed device 120. Terminals 210 and 220 are terminals that exist outside of the wireless LAN 100 (terminals that cannot support the wireless LAN) and are hereinafter referred to as external terminals 210 and 220.

In the example shown in FIG. 1, the L2HUB 130 and the APs 141-144 are present, but their functions may be incorporated in the fixed device 120.

Figure 2:
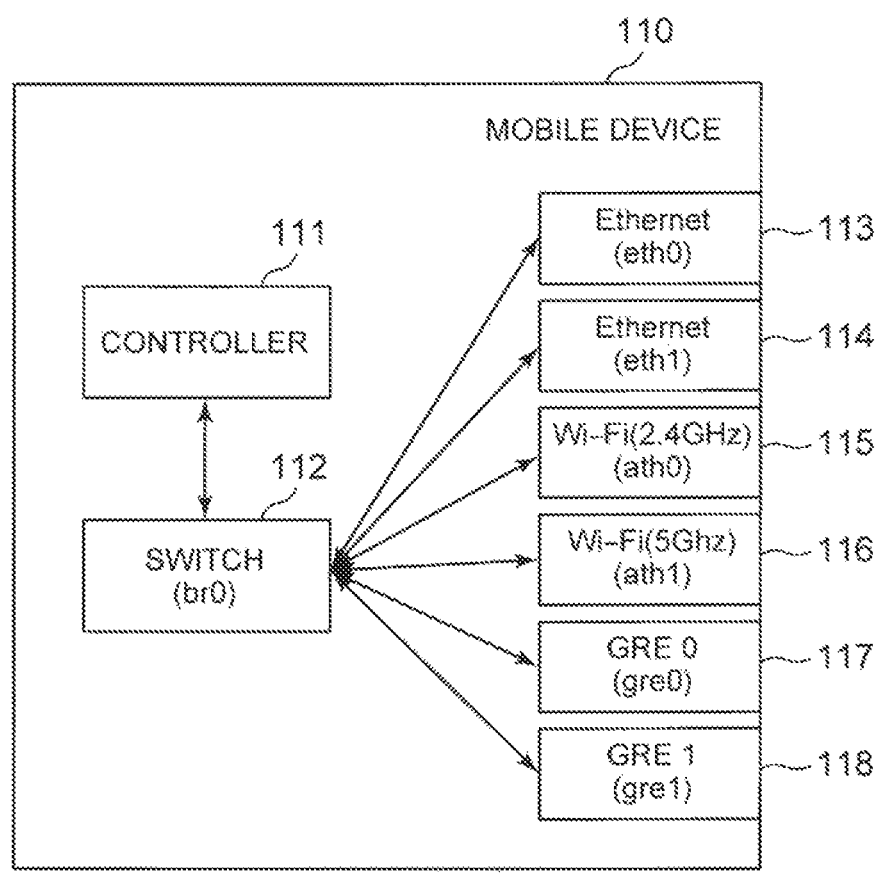
FIG. 2 It depicts a block diagram showing a configuration example of a mobile device.

FIG. 2 is a block diagram showing a configuration example of the mobile device 110. In this example embodiment, Generic Routing Encapsulation (GRE) is used as the tunneling protocol. The configuration of the mobile device 110 is assumed to be based on the concept of open flow (OpenFlow).

In the example shown in FIG. 2, the mobile device 110 has a controller 111, a switch (br0) 112, two ethernet (registered trademark) interfaces (eth0, eth1) 113, 114, a 2.4 GHz Wi-Fi interface (ath0) 115, a 5 GHz Wi-Fi interface (ath1) 116, and two GRE interfaces (gre0, gre1) 117, 118. The GRE interfaces 117, 118 have GRE-based capsulation (GRE capsulation) function.

The controller 111 corresponds to an OpenFlow controller. The switch 112 corresponds to an OpenFlow switch.

The ethernet interface 113, 114, and Wi-Fi interface 115, 116 are devices with communication functions based on the respective standards. The GRE interfaces 117, 118, for example, can be realized by a processor operating according to a program.

In the example shown in FIG. 2, the mobile device 110 with two ethernet interfaces 113, 114, two Wi-Fi interfaces 115, 116, and two GRE interfaces 117, 118 is illustrated, but it is not necessary to have two of each.

As shown in FIG. 2, when the mobile device 110 has two Wi-Fi interfaces 115, 116 and two GRE interfaces 117, 118, for example, the Wi-Fi interface 115 (ath0) is associated with the GRE interface 117 (gre0) and the Wi-Fi interface 116 (ath1) is associated with GRE interface 118 (gre1).

Figure 3:
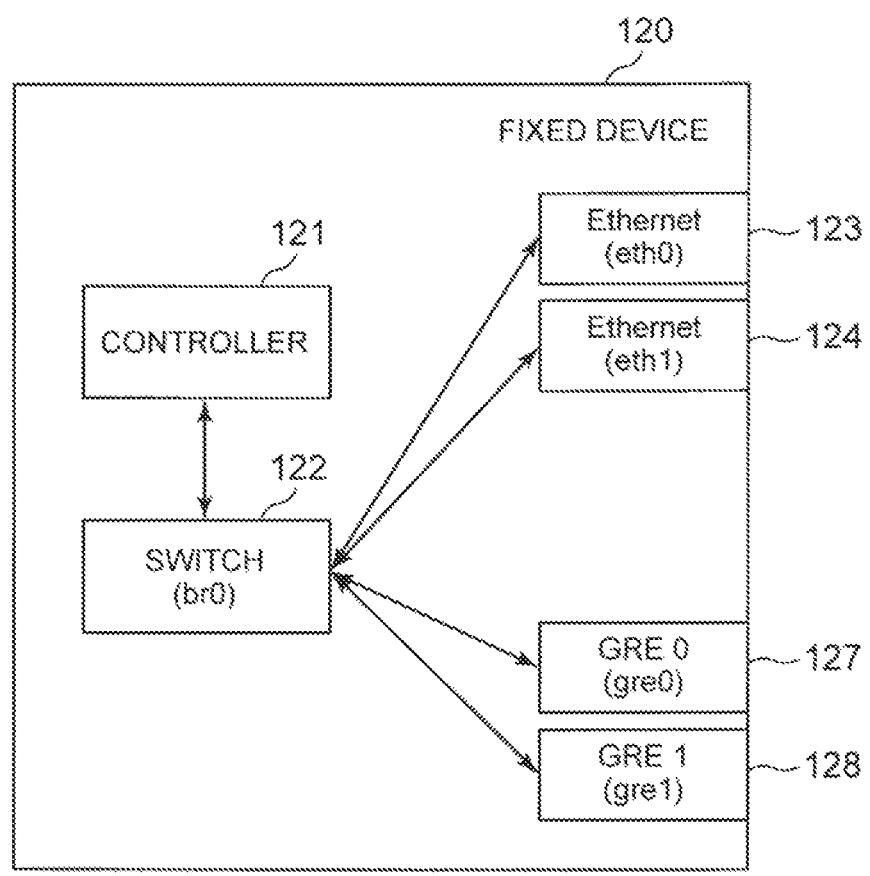
FIG. 3 It depicts a block diagram showing a configuration example of a fixed device.

FIG. 3 is a block diagram showing a configuration example of the fixed device 120. In the example shown in FIG. 3, the fixed device 120 has a controller 121, a switch (br0) 122, two ethernet interfaces (eth0, eth1) 123, 124, and two GRE interfaces (gre0, gre1) 127, 128.

The ethernet interfaces 123, 124 are devices with communication functions based on standards. The GRE interfaces 127, 128, for example, can be realized by a processor operating according to a program.

The configuration of the fixed device 120 is assumed to be based on the concept of open flow (OpenFlow). The controller 121 corresponds to an OpenFlow controller. The switch 122 corresponds to an OpenFlow switch.

In the example shown in FIG. 3, the fixed device 120 with two ethernet interfaces 123, 124 and two GRE interfaces 127, 128 illustrates, but it is not necessary to have two of each.

For example, only one ethernet interface 123 (eth0) may be provided. Two GRE interfaces 127, 128 (gre0, gre1) may be associated with one ethernet interface 123 (eth0). In that case, the ethernet interface 123 (eth0) is assigned an IP address for communication with gre0 and an IP (Internet Protocol) address for communication with gre1.

Next, referring to the explanatory diagrams in FIGS. 4 and 5, the setting example of IP addresses and MAC addresses for the external terminals 210, 220, each block in the mobile device 110, and each block in the fixed device 120 will be explained.

Figure 4:
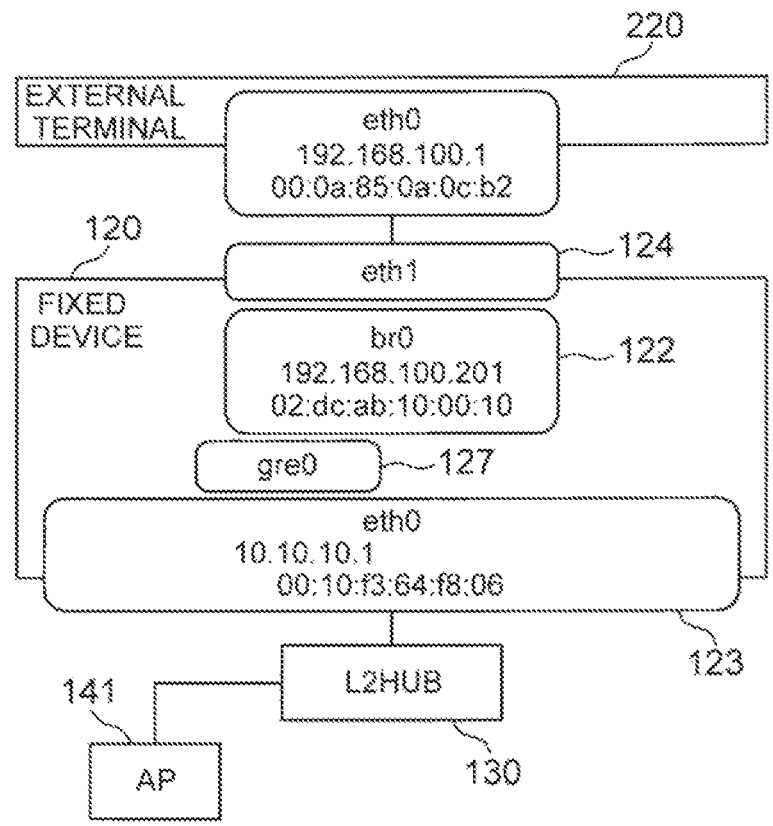
FIG. 4 It depicts a block diagram showing a setting example of an IP address and a MAC address related to a fixed device.

FIG. 4 shows a setting example of IP addresses and MAC addresses related to the fixed device 120. That is, assume that IP addresses and MAC addresses are set on the switch 122 and each interface in the fixed device 120 as shown in FIG. 4. An example of an IP address is shown in the upper part of each block. An example of a MAC address is shown in the bottom row of each block.

It should be noted that the GRE interface 127 of the two GRE interfaces 127, 128 is illustrated in FIG. 4.

Figure 5:
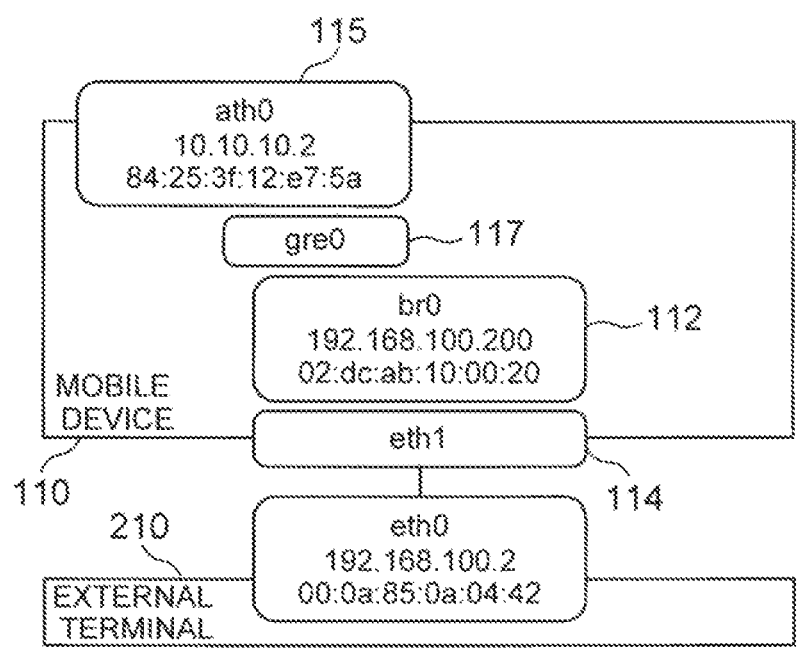
FIG. 5 It depicts a block diagram showing a setting example of an IP address and a MAC address related to a mobile device.

FIG. 5 shows a setting example of IP addresses and MAC addresses related to the mobile device 110. That is, assume that IP addresses and MAC addresses are set on the switch 112 and each interface in the mobile device 110 as shown in FIG. 5. An example of an IP address is shown in the upper part of each block. An example of a MAC address is shown in the bottom row of each block.

It should be noted that the ethernet interface 114 of the two ethernet interfaces 113, 114 is illustrated in FIG. 5. The Wi-Fi interface 115 of the two ethernet interfaces 113, 114 is illustrated. The GRE interface 117 of the two GRE interfaces 117, 118 is illustrated.

Figure 6:
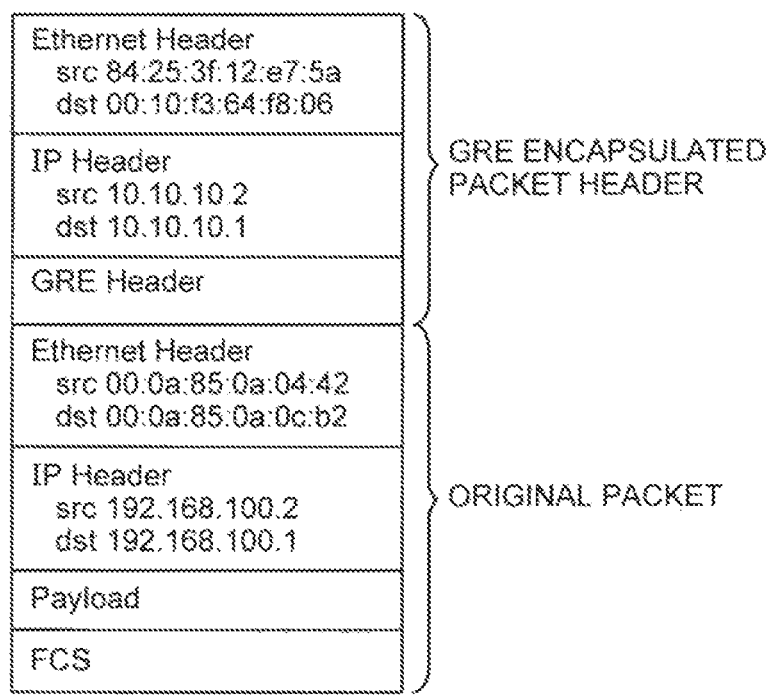
FIG. 6 It depicts an explanatory diagram showing a configuration example of an encapsulated packet.

FIG. 6 is an explanatory diagram showing a configuration example of an encapsulated packet (the initial packet to arrive). FIG. 6 illustrates the result of capsulation of a packet arriving from the external terminal 210 by the mobile device 110.

Referring to the example shown in FIG. 5, the part shown as the GRE encapsulated packet header in FIG. 6 is an external header. The external header comprises a new IP header (IP header) and a GRE header (GRE header). An ethernet header (ethernet is a registered trademark) in IEEE802.11 format, for example, is also added to the external header. In addition, the ethernet header and the IP header of the original packet (packet from the external terminal 210) are used as an internal header.

Next, the operation of the system shown in FIG. 1 is described.

Figure 7:
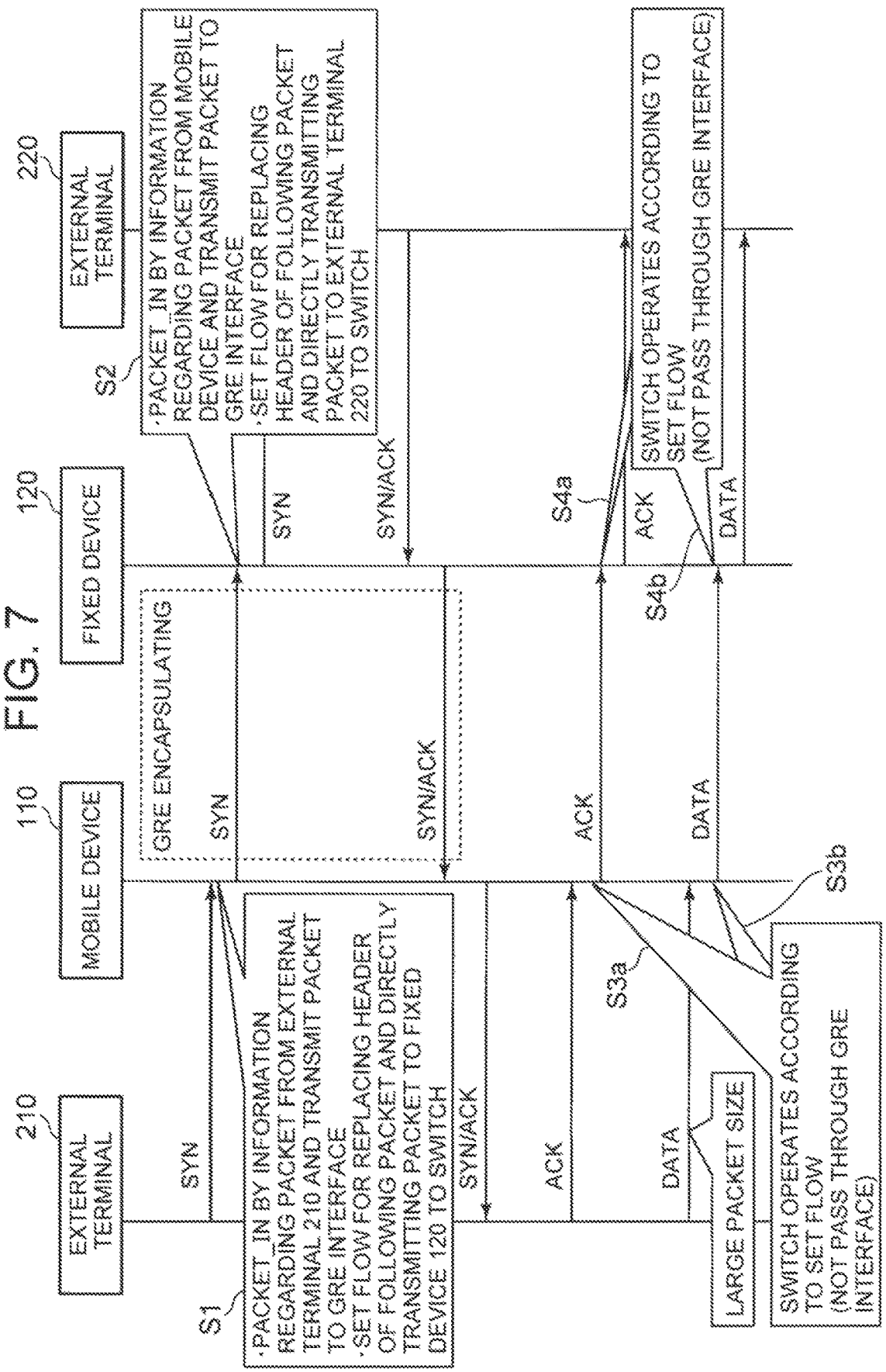
FIG. 7 It depicts a sequence diagram showing an operation of the system.

FIG. 7 is a sequence diagram showing the operation of the system. In FIG. 7, an example is shown when TCP (Transmission Control Protocol) communication is performed. In TCP communication, usually, a three-way handshake is performed before user data is transmitted.

In the example shown in FIG. 7, the external terminal 210 transmits the initial packet of the outward path to the mobile device 110. In TCP communication, the external terminal 210 transmits a packet with a SYN flag set. In the mobile device 110 that receives the packet, the GRE interface performs GRE capsulation and then transmits the packet toward the fixed device 120. At this time, the mobile device 110 sets a flow for the following packet to the switch 112 with high priority. The flow for following packets is a flow for packet forwarding processing by omitting a part of the packet header related to GRE capsulation. The mobile device 110 may set the priority of the flow to be the highest.

Specifically, the switch 112 makes a query to the controller 111 in the PACKET_IN message. In response to the query, the controller 111 sets up a flow, to the switch 122, by which replacing the header of the original packet (refer to FIG. 6) of the following packet with a header related to capsulation and transmitting the packet to the fixed device 120 is identified (step S1). Note that "directly transmitting to the fixed device 120" as described in FIG. 7 means that the packet is transmitted without going through the GRE interface.

The fixed device 120 that receives the packet transmits the GRE decapsulated packet to the external terminal 220. At this time, the flow for restoring the packet header of the following packet is set to the switch 122 in the fixed device 120 with a high priority (step S2). The fixed device 120 may set the priority of the flow to be the highest. The flow for restoring the packet header of the following packet is a flow for executing a process of replacing the packet header that has been changed to the GRE encapsulated packet header to the packet header of the original packet (the packet from the external terminal 210). The "directly transmitting to the external terminal 220" described in FIG. 7 means that the packet is transmitted without going through the GRE interface that executes the process of GRE decapsulation.

The external terminal 220 transmits the initial packet of the return path to the fixed device 120. In TCP communication, usually, the external terminal 220 transmits a packet with a SYN flag and an ACK flag set. In the fixed device 120 that receives the packet, the GRE interface performs GRE capsulation and transmits the packet toward the mobile device 110. At this time, the fixed device 120 sets the flow for the following packet to the switch 122 with high priority. The fixed device 120 may set the priority of the flow to be the highest. The flow for following packets is a flow for packet forwarding processing by omitting part of the packet header related to GRE capsulation.

Specifically, the switch 122 makes a query to the controller 121 in the PACKET_IN message. In response to the query, the controller 121 sets up a flow, to the switch 122, by which replacing the header of the original packet (refer to FIG. 6) of the following packet with a header related to capsulation and transmitting the packet to the mobile device 110 is identified.

Since the above process in the fixed device 120 is the same as the process in the mobile device 110 (refer to step S1), it is not listed as a comment in FIG. 7.

The mobile device 110 that receives the packet transmits the GRE decapsulated packet to the external terminal 210. At this time, the flow for restoring the packet header of the following packet is set to the switch 112 in the mobile device 110 with a high priority. The mobile device 110 may set the priority of the flow to be the highest. The flow for restoring the packet header of the following packet is a flow for executing the process of replacing the packet header that has been changed to the GRE encapsulated packet header to the packet header of the original packet (the packet from the external terminal 220).

Since the above process in the mobile device 110 is the same as the process in the fixed device 120 (refer to step S2), it is not listed as a comment in FIG. 7.

Next, the external terminal 210 transmits the following packet of the return path to the mobile device 110. In TCP communication, usually, the external terminal 210 transmits the packet with an ACK flag set. The mobile device 110 replaces the source MAC address and destination MAC address and the source IP address and destination IP address to those for GRE capsulation according to the set flow, subject to the 5 tuples of the input packet, and transmits the packet toward the fixed device 120. The packet is transmitted to the fixed device 120 (step S3a). In the mobile device 110, the packet does not pass through the GRE interface.

According to the set flow, the fixed device 120 rewrites the source and destination MAC addresses and the source and destination IP addresses, subject to the 5 tuples of the input packet, and transmits the packet to the external terminal 220 (step S4a). In the fixed device 120, the packet does not pass through the GRE interface.

The external terminal 210 then transmits the packet containing the user data to the mobile device 110. The mobile device 110 rewrites the source and destination MAC addresses and the source and destination IP addresses to those for GRE capsulation according to the set flow, and transmits the packet toward the fixed device 120 (step S3b). In the mobile device 110, the packet does not pass through the GRE interface.

The fixed device 120 replaces the source and destination MAC addresses and the source and destination IP addresses according to the set flow, and transmits the packet to the external terminal 220 (step S4b).

The size of packets containing user data may be large. When the external terminal 210 transmits a large volume of data, if the size of the packet exceeds the MTU (Maximum Transmission Unit) value set in the external terminal 210, the data is divided so that the size of the packet is less than or equal to the MTU value. In general, 1500 is used as the MTU value.

When the mobile device 110 receives a packet that is close to its MTU value, GRE capsulation of the packet will further increase the size of the packet. As a result, there is a high possibility that the size of the packet will exceed the MTU value of the mobile device 110. If the size of the packet exceeds the MTU value, the mobile device 110 executes a process of re-splitting the packet (re-splitting process: fragment process). The fragment process is a high-load process. In addition, when the fragment process is executed, the actual communication speed is reduced. If the mobile device 110 transmits packets without executing the fragment process, there is a possibility that packets will be lost in the way of a path.

In this example embodiment, since the GRE capsulation process is not executed for following packets, the fragment process caused by GRE capsulation is not executed. Therefore, loss of packets and degradation of communication speed are prevented.

Figure 8:
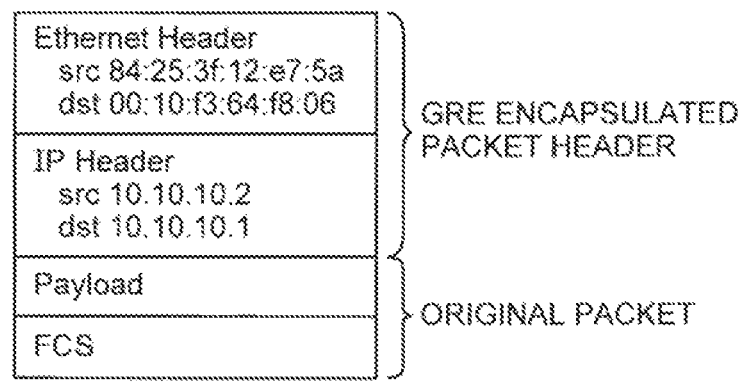
FIG. 8 It depicts an explanatory diagram showing a configuration example of a following packet in a wireless LAN.

FIG. 8 is an explanatory diagram showing a configuration example of following packets in a wireless LAN 100. FIG. 8 illustrates a result of the conversion of the header of the packet arriving from the external terminal 210 by the mobile device 110. When compared to the structure of the encapsulated packet shown in FIG. 6, it can be said that the GRE header and the internal header are omitted in the structure shown in FIG. 8.

Figure 9:
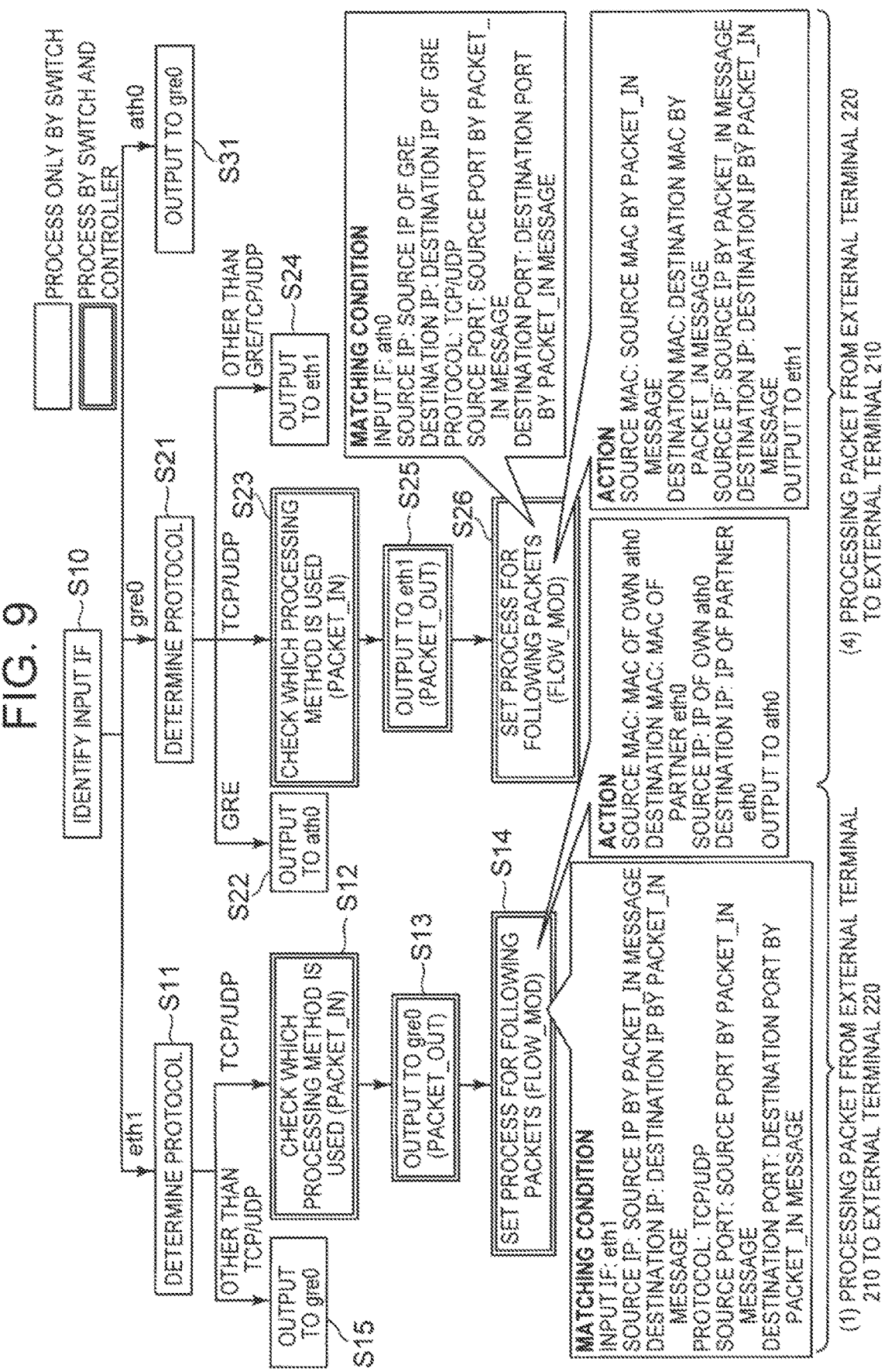
FIG. 9 It depicts a flowchart showing an example of a process of the mobile device.
Figure 10:
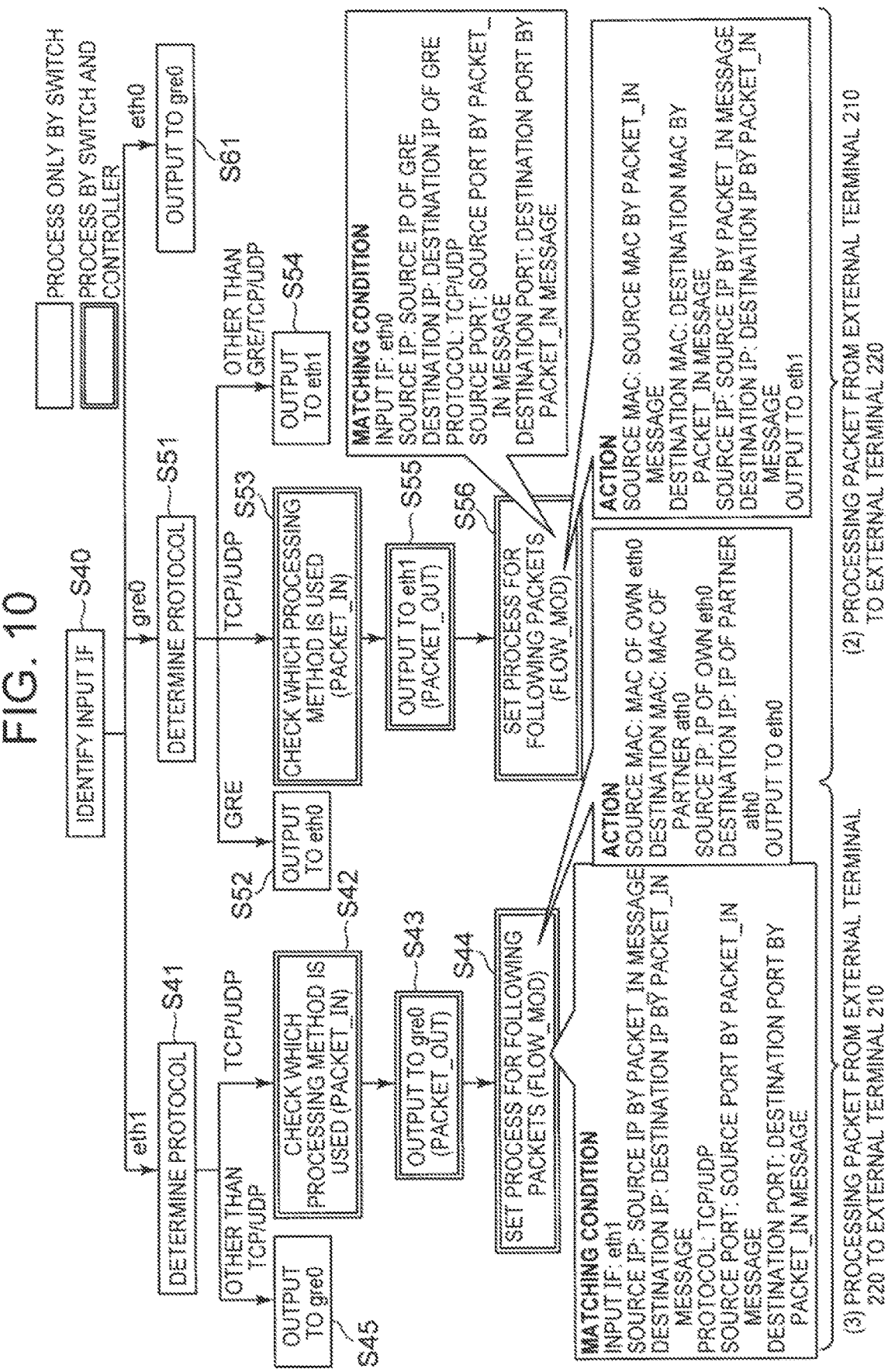
FIG. 10 It depicts a flowchart showing an example of a process of the fixed device.

Next, the operation of the system shown in FIG. 1 will be described with reference to the flowcharts in FIGS. 9 to 12. FIGS. 9 and 10 are flowcharts showing the processing for the initial packets from the external terminal 210 and the initial packet from the external terminal 220. The numbers placed between parentheses in FIGS. 9 and 10 indicate the order of processing.

First, the operation of the mobile device 110 will be described with reference to the flowchart in FIG. 9. The process shown in FIG. 9 is initiated when the mobile device 110 receives an initial packet with the SYN flag from the external terminal 210. The following example shows the case where the initial packet is received at ethernet interface 114 (eth1). In addition, the case where TCP (UDP (User Datagram Protocol) is also acceptable) is used as the protocol for communication between the external terminal 210 and the mobile device 110 will be used as an example.

In the mobile device 110, the switch 112 identifies the input IF (interface), i.e., the interface that received the packet, in step S10. In this example, since the packet is received on the ethernet interface 114 (eth1), the switch 112 determines the protocol in step S11. In this example, since the communication is taking place in TCP, the process proceeds to step S12.

In step S12, the switch 112 inquires of the controller 111 the processing method by the PACKET_IN message. The controller 111 instructs, by the PACKET_OUT message, to output the original packet (the packet received from the external terminal 210) to the GRE interface 117 (gre0), for example (step S13). Further, the controller 111 instructs the switch 112 to set a flow in the flow table with the FLOW_MOD message for processing of following packets (step S14).

Specifically, the flow is as follows, for example. The following contents are appended to step S14 in FIG. 9.
Matching condition
Input IF: eth1
Source IP address: Source IP address by PACKET_IN message
Destination IP address: Destination IP address by PACKET_IN message
Protocol: TCP/UDP
Source port: Source port by PACKET_IN message
Destination port: Destination port by PACKET_IN message
Action
Source MAC address: MAC address of own ath0
Destination MAC address: MAC address of the partner eth0
Source IP address: IP address of own ath0
Destination IP address: IP address of the partner eth0
Output to ath0

The source IP address by the PACKET_IN message in the matching condition corresponds to the IP address of the external terminal 210. The destination IP address of the PACKET_IN message corresponds to the IP address of the external terminal 220.

Figure 11:
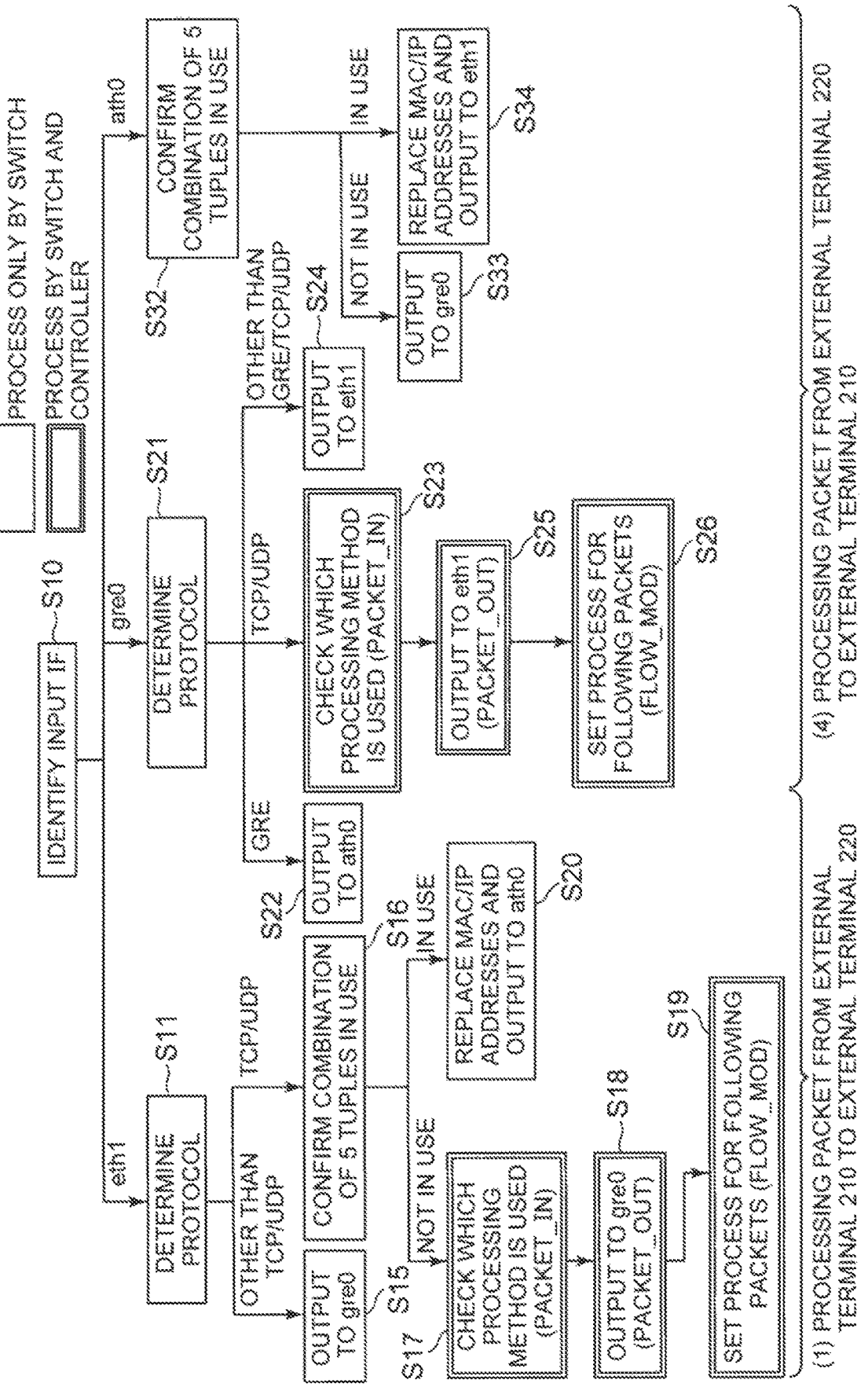
FIG. 11 It depicts a flowchart showing an example of processing a following packet of the mobile device.

Thereafter, the switch 112 executes operations described as the above action for a packet received at the ethernet interface 114 (eth1) when the above matching condition described in the flow table is satisfied (refer to FIG. 11).

If it is determined that it is not TCP/UDP in step S11, the switch 112 outputs the original packet to the GRE interface 117 (gre0), for example (step S15).

The GRE interface 117 (gre0) encapsulates the original packet by GRE.

The processes in steps S21 to S26 are related to GRE.

For the initial packet, the switch 112 identifies the input IF again (step S10) after GRE capsulation is executed by the GRE interface 117 (gre0). Since the input IF at this time is the GRE interface 117 (gre0), the switch 112 determines the protocol in step S21. In this example, since GRE capsulation has been executed, the process proceeds to step S22. In step S22, the switch 112 outputs the GRE encapsulated packet to, for example, the Wi-Fi interface 115 (ath0). The Wi-Fi interface 115 (ath0) transmits the GRE encapsulated packet.

The processing of steps S23 to S26 and S31 will be described later.

Next, the operation of the fixed device 120 will be described with reference to the flowchart in FIG. 10. The following is an example of a case in which the GRE encapsulated initial packet from the mobile device 110 is received at the ethernet interface 123 (eth0).

In the fixed device 120, the switch 122 identifies the interface that received the initial packet in step S40. In this example, since the packet is received on ethernet interface 123 (eth0), the switch 122 outputs the received packet to GRE interface 127 (gre0). The GRE interface 127 (gre0) unencapsulates the GRE of the received packet.

The switch 122 identifies the input IF again (step S40). Since the input IF is GRE interface 127 (gre0), the switch 122 determines the protocol in step S51. In this example, since communication is taking place over TCP, the process proceeds to step S53.

In step S53, the switch 122 inquires of the controller 121 the processing method by the PACKET_IN message. The controller 121 instructs, by the PACKET_OUT message, to output the received packet (the initial packet received from the mobile device 110) to the ethernet interface 124 (eth1), for example (step S55). The ethernet interface 124 (eth1) transmits the GRE decapsulated initial packet to the external terminal 220. Further, the controller 121 instructs the switch 122 to set a flow to the flow table with the FLOW_MOD message for processing of following packets (step S56).

Specifically, the flow is as follows, for example. The following contents are appended to step S56 in FIG. 10.

Matching condition
Input IF: eth0
Source IP address: Source IP address of GRE interface
Destination IP address: Destination IP address of GRE interface
Protocol: TCP/UDP
Source port: Source port by PACKET_IN message
Destination port: Destination port by PACKET_IN message
Action
Source MAC address: Source MAC address by PACKET_IN message
Destination MAC address: Destination MAC address by PACKET_IN message
Source IP address: Source IP address by PACKET_IN message
Destination IP address: Destination IP address by PACKET_IN message
Output to eth1

The source IP address by the PACKET_IN message in the action corresponds to the IP address of the external terminal 210. The destination IP address by the PACKET_IN message corresponds to the IP address of the external terminal 220.

Figure 12:
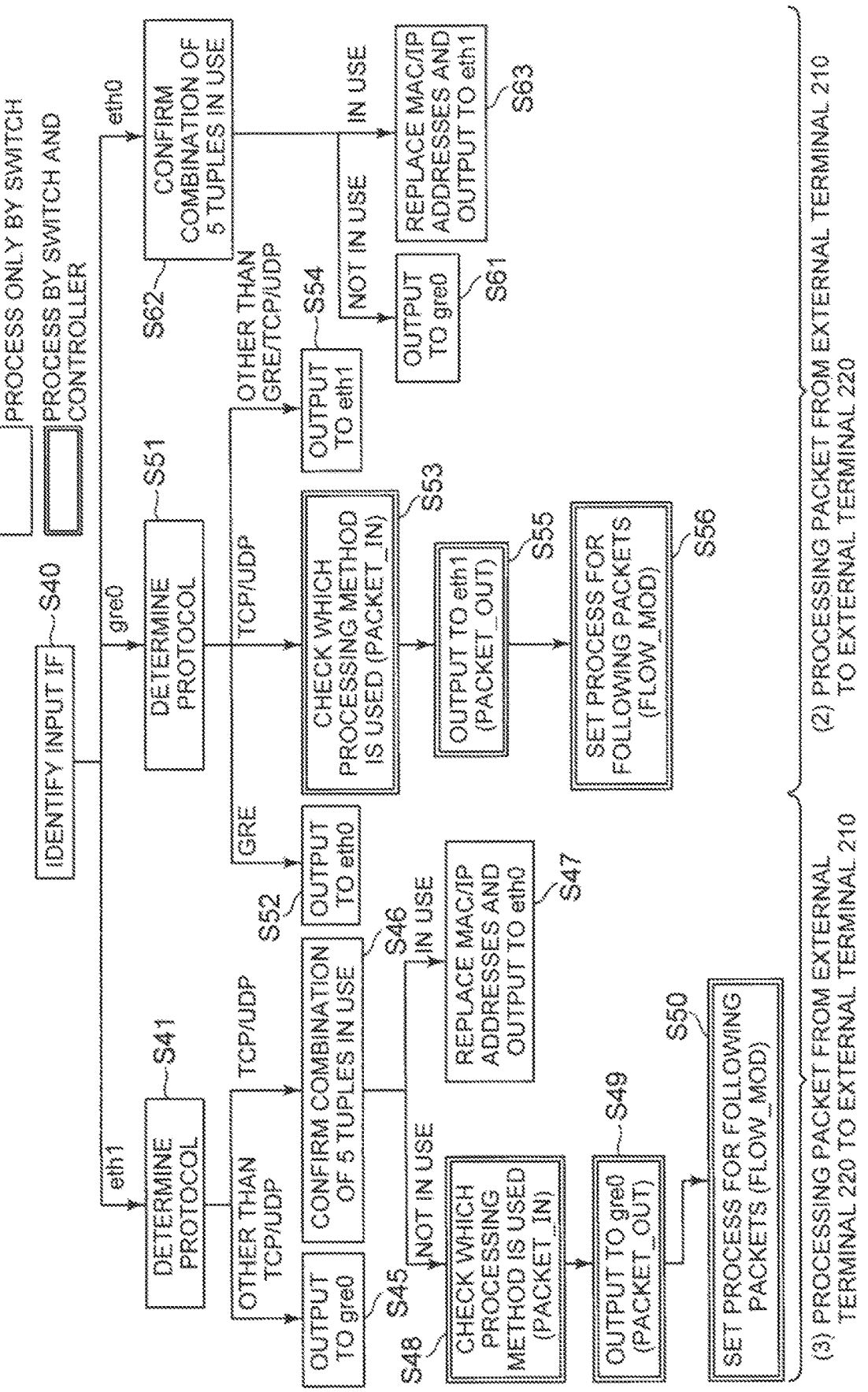
FIG. 12 It depicts a flowchart showing an example of processing a following packet of the fixed device.

Thereafter, the switch 122 executes operations described as the above action for a packet received on the ethernet interface 123 (eth0) when the above matching condition described in the flow table is satisfied (refer to FIG. 12).

If the protocol is other than GER, TCP and UDP, the switch 122 outputs the received packet to the ethernet interface 124 (eth1) (step S54).

When the initial packet with the SYN flag and the ACK flag arrives from the external terminal 220 as a return packet, the switch 122 identifies the input IF (step 40). Since the packet from the external terminal 220 is received at the ethernet interface 124 (eth1), the switch 122 determines the protocol in step S41. In this example, since communication is taking place in TCP, the process proceeds to step S42.

In step S42, the switch 122 inquires of the controller 121 the processing method by the PACKET_IN message. The controller 121 instructs, by the PACKET_OUT message, to output the GRE encapsulated initial packet to the GRE interface 127 (gre0), for example (step S43). Further, the controller 121 instructs the switch 122 to set up a flow in the flow table with the FLOW_MOD message for processing of following packets (step S44).

Specifically, the flow is as follows, for example. The following contents are appended to step S44 in FIG. 10.
Matching condition
Input IF: eth1
Source IP address: Source IP address by PACKET_IN message
Destination IP address: Destination IP address by PACKET_IN message
Protocol: TCP/UDP
Source port: Source port by PACKET_IN message
Destination port: Destination port by PACKET_IN message
Action
Source MAC address: MAC address of own eth0
Destination MAC address: MAC address of the partner ath0
Source IP address: IP address of own eth0
Destination IP address: IP address of the partner ath0
Output to eth0

The source IP address by the PACKET_IN message corresponds to the IP address of the external terminal 220. The destination IP address by the PACKET_IN message corresponds to the IP address of the external terminal 210.

Thereafter, the switch 122 executes the operations described as the above action for a packet received at the ethernet interface 124 (eth1) when the above matching condition described in the flow table is satisfied (refer to FIG. 12).

The initial packet from the external terminal 220 is output to the GRE interface 127 (gre0) (refer to step S43), and the GRE interface 127 (gre0) encapsulates the initial packet by GRE.

The switch 122 identifies the input IF again (step S40). In this case, the input IF is GRE interface 127 (gre0). The switch 122 determines the protocol in step S51. In this example, since the protocol is GRE, the process proceeds to step S52.

In step S52, the switch 122 outputs the GRE encapsulated packet to the ethernet interface 123 (eth0), for example. The ethernet interface 123 (eth0) transmits the GRE encapsulated packet to the mobile device 110.

In the mobile device 110, the switch 112 identifies the input IF when a packet from the fixed device 120 is received (step S10 in FIG. 9). For example, when a packet from the fixed device 120 is received at the Wi-Fi interface 115 (ath0), the process proceeds to step S31. In step S31, the switch 112 outputs the initial packet to the GRE interface 117 (gre0), for example.

The GRE interface 117 (gre0) decapsulates the initial packet from the external terminal 220 through the fixed device 120.

The switch 112 identifies the input IF again (step S10). In this example, the input IF is the GRE interface 117 (gre0). The switch 112 determines the protocol in step S21. In this example, since communication is taking place in TCP, the process proceeds to step S23.

In step S23, the switch 112 inquires of the controller 111 the processing method by the PACKET_IN message. The controller 111 instructs, by the PACKET_OUT message, to output the packet (the initial packet received from the fixed device 120) to the ethernet interface 114 (eth1) (step S25). The ethernet interface 114 (eth1) transmits the initial packet received from the fixed device 120 to the external terminal 210. Further, the controller 111 instructs to set a flow in the flow table with the FLOW_MOD message for processing of following packets (step S26).

Specifically, the flow is as follows, for example. The following contents are appended to step S26 in FIG. 9.
Matching condition
Input IF: ath0
Source IP address: Source IP address of GRE interface
Destination IP address: Destination IP address of GRE interface
Protocol: TCP/UDP
Source port: Source port by PACKET_IN message
Destination port: Destination port by PACKET_IN message
Action
Source MAC address: Source MAC address by PACKET_IN message
Destination MAC address: Destination MAC address by PACKET_IN message
Source IP address: Source IP address by PACKET_IN message Destination IP address: Destination IP address by PACKET_IN message
Output to eth1

The source IP address by the PACKET_IN message corresponds to the IP address of the external terminal 220. The destination IP address by the PACKET_IN message corresponds to the IP address of the external terminal 210.

Thereafter, the switch 112 executes the operations described as the above action for a packet received at the Wi-Fi interface 115 (ath0) when the above matching condition described in the flow table is satisfied (refer to FIG. 11).

FIGS. 11 and 12 are flowcharts showing the processing for the following packet from external terminal 210 and the following packet from the external terminal 220. The numbers placed between parentheses in FIGS. 11 and 12 indicate the order of processing.

First, the processing of following packets by the mobile device 110 will be described with reference to the flowchart in FIG. 11. In other words, the operation of the mobile device 110 after the flow table is generated will be described.

In general, the mobile device 110 first receives a packet with the ACK flag from the external terminal 210.

In the mobile device 110, the switch 112 identifies the interface that received the packet in step S10. In this example, since the packet is received on the ethernet interface 114 (eth1), the switch 112 determines the protocol in step S11. In this example, since the communication is taking place in TCP, the process proceeds to step S16.

In step S16, once the switch 112 confirms that the 5 tuples of the input packet is the 5 tuples (capable of identifying the packet going from the external terminal 210 to the external terminal 220) (step S16) in use, the process proceeds to step S20.

If the switch 112 determines that the 5 tuples of the input packet is not the 5 tuples in use, the process of steps S17 to S19 is executed. The process of steps S17 to S19 is the same as the process of steps S12 to S14 shown in FIG. 9.

In step S20, since the matching condition is satisfied (i.e., the 5 tuples in use are identified), the switch 112 executes the action set in the flow table. Therefore, the switch 112 replaces the MAC address and the IP address of the packet and outputs the packet to the Wi-Fi interface 115 (ath0). The Wi-Fi interface 115 (ath0) transmits the packet.

The process of replacing the MAC address and the IP address is specifically the process of changing the MAC address and the IP address of the packet from the external terminal 210 to the external terminal 220 to the MAC address and the IP address of the Wi-Fi interface (ath0) 115 in the mobile device 110 and the ethernet interface 123 (eth0) in the fixed device 120 (refer to the appendix of step S14 in FIGS. 6, 8, and 9).

The processing following packets of the fixed device 120 will be described with reference to the flowchart in FIG. 12. In other words, the operation of the fixed device 120 after the flow table is generated will be described.

In the fixed device 120, the switch 122 identifies the interface that received the packet in step S40. In this example, since the packet is received on the ethernet interface 124 (eth1), the switch 122 determines the protocol in step S41. In this example, since communication is taking place in TCP, the process proceeds to step S46.

In step S46, once the switch 122 confirms that the 5 tuples of the input packet is the 5 tuples (capable of identifying the fact that the GRE encapsulated packet header is set, etc.) in use, the process proceeds to step S47.

If the switch 122 determines that the 5 tuples of the input packet is not the 5 tuples in use, the process proceeds to step S48.

In step S47, since the matching condition is satisfied (i.e., the 5 tuples in use are identified), the switch 122 executes the action set in the flow table. Therefore, the switch 112 replaces the MAC address and the IP address of the packet and outputs the packet to the ethernet interface 123 (eth0). The ethernet interface 123 (eth0) transmits the packet to the external terminal 220.

The process of replacing the MAC address and the IP address is specifically the process of changing the MAC address and the IP address in the ethernet header (refer to FIG. 8) set in the received packet to the MAC address and the IP address of the external terminal 210, 220 (refer to the appendix of step S44 in FIG. 10).

When a following packet on the return path arrives from the external terminal 220, the switch 122 identifies the input IF (step 40). Since the packet from the external terminal 220 is received at the ethernet interface 123 (eth0), the process proceeds to step S62.

In step S62, once the switch 122 confirms that the 5 tuples of the input packet is the 5 tuples (capable of identifying the packet going from the external terminal 220 to the external terminal 210) in use, the process proceeds to step S63.

If the switch 112 determines that the 5 tuples of the input packet is not the 5 tuples in use, the process of step S61 and steps S51 to S56 is executed.

In step S63, the matching condition is satisfied (i.e., it is the 5 tuples in use). Therefore, the switch 112 executes the action set in the flow table. Therefore, the switch 112 replaces the MAC address and the IP address of the packet and outputs the packet to the ethernet interface 124 (eth1). The ethernet interface 124 (eth1) transmits the packet to the mobile device 110.

The process of replacing the MAC address and the IP address is specifically the process of changing the MAC address and the IP address of the packet from the external terminal 210 to the external terminal 220 to the MAC address and the IP address of the ethernet interface 123 (eth0) in the fixed device 120 and the Wi-Fi interface (ath0) 115 in the mobile device 110 (refer to the appendix of step S44 in FIG. 10).

In the mobile device 110, the switch 112 identifies the input IF when a packet from the fixed device 120 is received (step S10 in FIG. 11). In this example, since the packet from the fixed device 120 is received at the Wi-Fi interface 115 (ath0), the process proceeds to step S32. In step S32, once the switch 112 confirms that the 5 tuples of the input packet is the 5 tuples in use, the process proceeds to step S34.

In step S34, since the matching condition is satisfied (i.e., the 5 tuples in use are identified), the switch 112 executes the action set in the flow table. Therefore, the switch 112 replaces the MAC address and the IP address of the packet and outputs the packet to the ethernet interface 124 (eth1). The ethernet interface 124 (eth1) transmits the packet to the external terminal 210.

The process of replacing the MAC address and IP address is specifically the process of changing the ethernet header and the IP header to the MAC address and the IP address of the external terminal 220 and external terminal 210 (refer to FIGS. 6, 8, and the appendix of step S26 in FIG. 9).

In this example embodiment, the external terminals 210, 220 can communicate without being aware of the existence of a wireless LAN in the way of a path. Furthermore, in a network configuration where each external terminal has an IP address in the same subnetwork, the Address Resolution Protocol (ARP) procedure, etc., can be implemented without any modification.

In addition, this example embodiment suppresses the reduction in throughput (communication speed) that occurs during general packet capsulation. It also reduces the possibility of packet loss in the way of a path.

Compared to the method of compressing a packet header size, this example embodiment has the advantage that it is not necessary to prepare a new address to uniquely identify the context that contains the information to reconstruct the header connection. In addition, there is no need for additional setting of packet filtering and routing for the new address. As a result, there is no increase in the number of management man-hours required for additional setting, and no security concerns during additional setting. Further, when adopting the method of preparing a new address for each flow to identify the context, it is prevented to run out of information to identify the context if many devices are connected. Furthermore, there is no need to agreement for new addresses for uniquely identifying contexts among external terminals, etc., in advance. Additionally, there is no need to define messages for agreement in advance between external terminals. Further, there is no time lag before the start of communication and extra communication due to agreement in advance.

In the above example embodiment, the case where four APs 141-144 are installed is used as an example, but the communication method in the above example embodiment is maintained even when additional APs are installed. Specifically, even if the communication path changes to go through the additional APs, the general wireless LAN reconnection process is all that is required, and there is no need to consider the communication process in the way of a path at layers above the IP layer.

When generating a flow for switch 112 in mobile device 110 and switch 122 in fixed device 120, flows for transmitting and receiving packets on other paths may be generated in advance. In the case of using GRE, since the IP address of the other side needs to be known when establishing the network interface of the GRE, the mapping is easy and other flows can be easily generated.

In such a configuration, when only the general wireless LAN reconnection process is executed, the communication method in the above example embodiment is applied to the layers above the IP layer, without any special consideration to the communication process in the way of a path. In addition, by providing multiple wireless LAN interfaces, when the wireless quality of one path deteriorates, stable communication can be continued by switching to the other path.

In the above example embodiment, there is one mobile device 110, but the communication method in the above example embodiment can be applied to a system in which there are multiple mobile devices and each mobile device communicates with a fixed device. In such a system, when assigning an IP address to the wireless LAN interface of a mobile device, it is sufficient to assign an IP address to each mobile device so that an address is not duplicated.

In the above example embodiment, there is one external terminal 220 in the fixed device 120, but the communication method in the above example embodiment can be applied to a system in which there are multiple external terminals and each external terminal is configured to communicate with an external terminal 210 connected to the mobile device 110.

If there are external terminals other than the external terminal 210 connected to the mobile device 110 and those external terminals can communicate with the external terminal 220 at the same time, the controller 111 of the mobile device 110 converts the TCP/UDP port so that it does not overlap with TCP/UDP ports used by the other external terminals. For example, the mobile device 110 can execute a process that applies the concept of NAPT (Network Address Port Translation). Specifically, the mobile device 110 has a NAPT table, and the controller 111 may manage the five tuples in the packet header by referring to the NAPT table.

In addition, if there are external terminals other than the external terminal 210 connected to the mobile device 110, and these external terminals can communicate with the external terminal 220 at the same time, the controller 111 of the mobile device 110 assigns a unique VLAN ID (Virtual LAN Identifier) to each external terminal connected to the mobile device 110. When external terminals communicate with each other, the intermediate mobile device adds a VLAN tag to each packet and sets the assigned VLAN ID, starting with the initial packet transmitted on the outward path. The fixed device 120 that receives the packet stores the VLAN ID as information to identify the external terminal. The fixed device 120 transmits the packet from which the VLAN tag is removed to the destination external terminal. The same process is executed for the initial packet on the return path. For following packets, the VLAN tag with the VLAN ID is assigned at the transmitting side, and the receiving side may restore the original ethernet header and the IP header on the basis of the VLAN ID.

In other words, by changing the decision based on TCP/UDP to one based on VLAN ID in the process shown in FIG. 9 to FIG. 12, the communication method in the above example embodiment can be applied.

In a case where external terminals communicate with each other using packets to which VLAN tags have been assigned, the communication method in the above example embodiment can be applied even if a VLAN tag is set in the original packet. However, the device on the receiving side of the packet (e.g., the fixed device 120 for the initial packet on the outward path in communication from the external terminal 210 to the external terminal 220) generates a flow on the basis of the header information of the original packet at the time of the communication, but also stores the VLAN tag part and sets up a flow that includes the action to insert the VLAN tag.

As explained above, the above example embodiment discloses the packet capsulation method for tunneling in a wireless communication channel included in a communication channel between multiple communicating terminals.

In other words, the packet capsulation method performs encapsulating by adding a header (for example, GRE header, etc.) for capsulation to a first initial packet from a first terminal (for example, the external terminal 210) to a second terminal (for example, the external terminal 220) serving as a partner terminal, stores data capable of identifying a path of a packet following the first initial packet in the wireless communication channel (for example, the wireless LAN 100), performs encapsulating by adding a header for capsulation to a second initial packet from the second terminal to the first terminal, and stores data (for example, a flow in OpenFlow technology) capable of identifying a path of a packet following the second initial packet in the wireless communication channel, and transmits the packet following the first initial packet and the packet following the second initial packet to the wireless communication channel without encapsulating, according to the data capable of identifying the path of the packet.

In the above example embodiment, the GRE is used as the tunnel protocol, but other tunnel protocols at Layer 3 that are capable of routing may be used.

Figure 13:
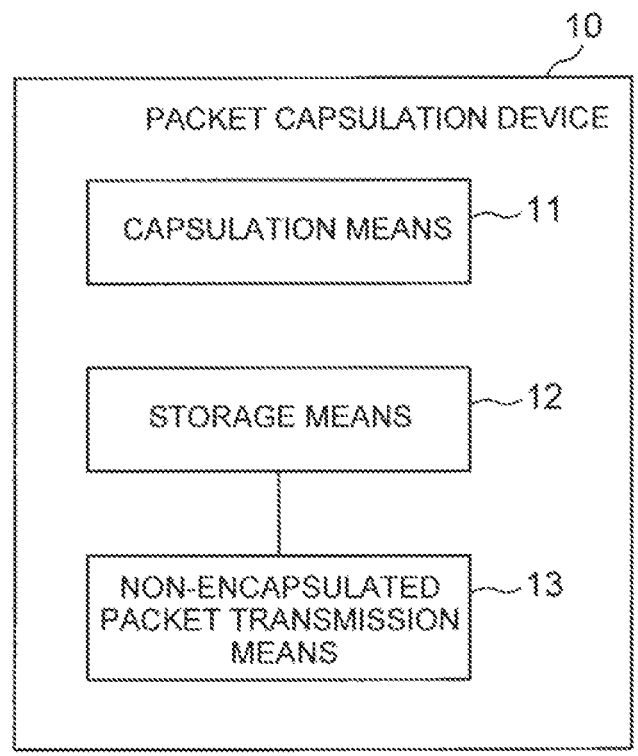
FIG. 13 It depicts a summarized block diagram showing a packet capsulation device.

FIG. 13 is a summarized block diagram showing a packet capsulation device. The packet capsulation device 10 (in the example embodiment, the mobile device 110 or the fixed device 120) comprises capsulation means 11 (in the example embodiment, realized by the GRE interface 117, 118 (gre0, gre1) in the mobile device 110 or the GRE interface 127, 128 (gre0, gre1) in the fixed device 120) for encapsulating an initial packet in communication between a first terminal (for example, the external terminal 210) and a second terminal (for example, the external terminal 220) serving as a partner terminal by adding a header for capsulation (for example, GRE header, etc.), and for non-encapsulating on reception of an encapsulated packet, storage means 12 (in the example embodiment, realized by the switch 112 in the mobile device 110 or the switch 122 in the fixed device 120) for storing data (for example, a flow in OpenFlow technology) capable of identifying a path of a packet following the initial packet in the wireless communication channel (for example, the wireless LAN 100), and non-encapsulated packet transmission means 13 (in the example embodiment, realized by the switch 112 and interfaces other than the GRE interface in mobile device 110 or the switch 122 and interfaces other than the GRE interface in the fixed device 120) for transmitting the packet following the initial packet to the wireless communication channel without encapsulating, according to the data capable of identifying the path of the packet.

While the present invention has been described with reference to the example embodiment, the present invention is not limited to the aforementioned example embodiment. Various changes understandable to those skilled in the art within the scope of the present invention can be made to the structures and details of the present invention.

This application claims priority based on Japanese patent application 2019-037499 filed on Mar. 1, 2019, the disclosures of which are incorporated herein in their entirety.

REFERENCE SIGNS LIST

10 Packet capsulation device
11 Capsulation means
12 Storage means
13 Non-encapsulated packet transmission means
100 Wireless LAN
110 Mobile device
111 Controller
112 Switch
113 Ethernet interface (eth0)
114 Ethernet interface (eth1)
115 Wi-Fi interface (ath0)
116 Wi-Fi interface (ath1)
117 GRE interface (gre0)
118 GRE interface (gre1)
120 Fixed device
121 Controller
122 Switch
123 Ethernet interface (eth0)
124 Ethernet interface (eth1)
127 GRE interface (gre0)
128 GRE interface (gre1)
130 L2HUB
141-144 AP
210, 220 Terminal (External terminal)

What is claimed is:

1. A packet capsulation method that performs capsulation for tunneling in a wireless communication channel included in a communication channel between multiple communicating terminals, the packet capsulation method comprising:
    encapsulating by adding a first header for capsulation to a first initial packet from a first terminal to a second terminal serving as a partner terminal;
    storing data capable of identifying a path of a packet following the first initial packet in the wireless communication channel, which is data capable of identifying an interface transmitting the packet in a first device that receives the packet from the first terminal and an interface receiving the packet from the first device in a second device that receives the packet from the second terminal;
    encapsulating by adding a second header for capsulation to a second initial packet from the second terminal to the first terminal;
    storing data capable of identifying a path of a packet following the second initial packet in the wireless communication channel;
    transmitting the packet following the first initial packet and the packet following the second initial packet to the wireless communication channel without encapsulating, according to the data capable of identifying the path of the packet; and
    replacing the header of the packet according to the data capable of identifying the path of the packet following the first initial packet when transmitting the packet following the first initial packet to the wireless communication channel.

2. The packet capsulation method according to claim 1, wherein
    the capsulation is performed by adding a GRE header to the first initial packet and the second initial packet.

3. The packet capsulation method according to claim 2, wherein
    the data capable of identifying the path of the packet is stored as a flow in an OpenFlow.

4. The packet capsulation method according to claim 2, wherein
    the data capable of identifying the path of the packet following the second initial packet is data capable of identifying an interface transmitting the packet in the second device that receives the packet from the second terminal and an interface receiving the packet from the second device in the first device that receives the packet from the first terminal,
    the method further comprising replacing the header of the packet according to the data capable of identifying the path of the packet following the second initial packet when transmitting the packet following the second initial packet to the wireless communication channel.

5. The packet capsulation method according to claim 1, wherein
    the data capable of identifying the path of the packet is stored as a flow in an OpenFlow.

6. The packet capsulation method according to claim 5, wherein
    the data capable of identifying the path of the packet following the second initial packet is data capable of identifying an interface transmitting the packet in the second device that receives the packet from the second terminal and an interface receiving the packet from the second device in the first device that receives the packet from the first terminal, the method further comprising replacing the header of the packet according to the data capable of identifying the path of the packet following the second initial packet when transmitting the packet following the second initial packet to the wireless communication channel.

7. The packet capsulation method according to claim 1, wherein the data capable of identifying the path of the packet following the second initial packet is data capable of identifying an interface transmitting the packet in the second device that receives the packet from the second terminal and an interface receiving the packet from the second device in the first device that receives the packet from the first terminal, the method further comprising replacing the header of the packet according to the data capable of identifying the path of the packet following the second initial packet when transmitting the packet following the second initial packet to the wireless communication channel.

8. A packet capsulation device that encapsulates for tunneling in a wireless communication channel included in a communication channel between multiple communicating terminals comprising:

a memory storing software instructions;

a storage device which stores data capable of identifying a path of a packet following an initial packet in the wireless communication channel, which is data capable of identifying an interface in the packet capsulation device transmitting the packet from a first terminal or a second terminal to the wireless communication channel and an interface in a partner device receiving the packet from the wireless communication channel; and one or more processors configured to execute the software instructions to:

encapsulate the initial packet in communication between the first terminal and the second terminal serving as the partner terminal by adding a header for capsulation, and for non-encapsulating on reception of an encapsulated packet;

transmit the packet following the initial packet to the wireless communication channel without encapsulating, according to the data capable of identifying the path of the packet;

replace the header of the packet according to the data capable of identifying the path of the packet when transmitting the packet following the initial packet to the wireless communication channel.

9. The packet capsulation device according to claim 8, wherein the one or more processors are configured to execute the software instructions to encapsulate by adding a GRE header to the initial packet.

10. The packet capsulation device according to claim 9, wherein the storage device stores the data capable of identifying the path of the packet as a flow in an OpenFlow.

11. The packet capsulation device according to claim 8, wherein the storage unit device stores the data capable of identifying the path of the packet as a flow in an OpenFlow.

\* \* \* \* \*